United States Patent [19]

Denzinger et al.

[11] Patent Number: 5,658,993

[45] Date of Patent: Aug. 19, 1997

[54] WATER-SOLUBLE OR WATER-DISPERSIBLE GRAFT COPOLYMERS, THE PREPARATION THEREOF AND THE USE THEREOF

[75] Inventors: Walter Denzinger, Speyer; Axel Kistenmacher, Ludwigshafen; Johannes Perner, Neustadt; Angelika Funhoff, Schriesheim; Birgit Potthoff-Karl, Ludwigshafen; Hans-Jürgen Raubenheimer, Ketsch, all of Germany

[73] Assignee: BASF Aktiengesellschaft, Ludwigshafen, Germany

[21] Appl. No.: 593,522

[22] Filed: Jan. 30, 1996

[30] Foreign Application Priority Data

Feb. 3, 1995 [DE] Germany ............... 195 03 546.1

[51] Int. Cl.$^6$ ........................................... C08L 35/00
[52] U.S. Cl. ................................... 525/285; 526/272
[58] Field of Search ........................... 525/285; 526/272

[56] References Cited

U.S. PATENT DOCUMENTS

| | | | |
|---|---|---|---|
| 3,810,834 | 5/1974 | Jones et al. | 526/229 |
| 4,818,795 | 4/1989 | Denzinger et al. | 525/327.1 |

FOREIGN PATENT DOCUMENTS

| | | |
|---|---|---|
| 0 009 171 | 4/1980 | European Pat. Off. . |
| 0 264 627 | 4/1988 | European Pat. Off. . |
| 0 396 303 | 11/1990 | European Pat. Off. . |
| 0 267 464 | 3/1993 | European Pat. Off. . |
| 0252835 | 12/1987 | German Dem. Rep. . |
| 4034901 | 4/1992 | Germany . |
| 1 024 725 | 4/1966 | United Kingdom . |
| 1 411 063 | 10/1975 | United Kingdom . |
| WO94/12571 | 6/1994 | WIPO . |

*Primary Examiner*—Irina S. Zemel
*Attorney, Agent, or Firm*—Oblon, Spivak, McClelland, Maier & Neustadt, P.C.

[57] ABSTRACT

A water-soluble or water-dispersible graft copolymer obtainable by free-radical graft copolymerization of
(I) at least one monoethylenically unsaturated monomer onto
(II) polymers with a molecular weight of 200–5000 of monoethylenically unsaturated dicarboxylic acids or anhydrides thereof using from 5 to 2,000 parts by weight of the monomers (I) per 100 parts by weight of grafting base, a process for preparing the graft copolymers and the use of the graft copolymers as additive to phosphate-free or reduced phosphate textile detergents, as dispersants and preventers of deposits in cleaners for hard surfaces and as water-treatment agents for reducing the deposition of scale and the separation out of water hardness in water-conveying systems.

9 Claims, No Drawings

WATER-SOLUBLE OR WATER-DISPERSIBLE GRAFT COPOLYMERS, THE PREPARATION THEREOF AND THE USE THEREOF

The invention relates to water-soluble or water-dispersible graft copolymers obtainable by free-radical graft copolymerization of monoethylenically unsaturated monomers onto polymers of monoethylenically unsaturated dicarboxylic acids or anhydrides thereof, to a process for the preparation thereof and to the use of the polymers as additive to phosphate-free or reduced phosphate textile detergents, as dispersants and preventers of deposits in cleaners for hard surfaces and as water-treatment agents for reducing the deposition of scale and the separation out of water hardness in water-conveying systems.

GB-A 1 024 725 discloses a process for preparing polymaleic anhydride in which maleic anhydride is polymerized in inert solvents, eg. dialkyl ethers, tetrahydrofuran, dioxane, benzene or chlorinated hydrocarbons such as chloroform, in the presence of organic percarbonates or diacyl peroxides. Particularly preferred solvents are benzene and chloroform. The polymerization initiators used are, for example, diisopropyl percarbonate, dibenzoyl peroxide and dicyclohexyl percarbonate in amounts of from 2 to 40% of the weight of maleic anhydride. The polymers prepared in this way contain considerable amounts of unpolymerized maleic anhydride.

The process of GB-A 1 411 063 results in polymaleic anhydride by polymerization of maleic anhydride in xylene as solvent, which contains up to 99% of ortho-xylene, using as polymerization initiator di-tert-butyl peroxide in an amount of from 15 to 40% of the weight of maleic anhydride. The polymers prepared by this process also contain considerable amounts of unpolymerized maleic anhydride.

U.S. Pat. No. 3,810,834 discloses the use of hydrolyzed polymaleic anhydrides with a molecular weight of from 300 to 5,000 before the hydrolysis, or water-soluble salts of such hydrolyzed polymaleic anhydrides, in water treatment, in which case the formation of scale is reduced and, in many cases, virtually prevented. The polymers suitable for this purpose are prepared by polymerizing maleic anydride in toluene using benzoyl peroxide and subsequently hydrolyzing the polymaleic anhydride obtained in this way. Since the polymerization of maleic anhydride is incomplete, and it is difficult to separate unpolymerized maleic anhydride from the polymer, the polymaleic acids contain considerable amounts of maleic acid. This disadvantage is avoided in the process disclosed in U.S. Pat. No. 4,818,795 by using peroxy esters as polymerization initiators.

EP-A 0 264 627 discloses slightly crosslinked water-soluble polymaleic acids obtainable by polymerizing maleic anhydride with from 0.1 to 10 percent by weight, based on maleic anhydride, of a crosslinker containing at least 2 ethylenic double bonds in an aromatic hydrocarbon at from 60° to 200° C. in the presence of from 1 to 20% by weight, based on maleic anhydride, of a peroxy ester and hydrolyzing the resulting polymer containing anhydride groups. The polymerization is preferably carried out in benzene, toluene, xylene, ethylbenzene, diethylbenzene, isopropylbenzene, diisopropylbenzene or mixtures of said aromatic hydrocarbons. The water-soluble polymaleic acids obtainable in this way are used as water-treatment agents for reducing the deposition of scale and separation out of water hardness in water-conveying systems.

EP-B 0 276 464 discloses a process for preparing water-soluble copolymers of maleic acid in which maleic anhydride and from 1 to 20% by weight of a monoethylenically unsaturated monomer which is copolymerizable with maleic anhydride are copolymerized in an aromatic hydrocarbon at from 60° to 210° C. in the presence of from 1 to 20% by weight, based on the monomers, of peroxy esters. The copolymers obtainable in this way are used in hydrolyzed form as water-treatment agents in water-conveying systems.

EP-B 0 009 171 discloses a process for preparing polymaleic acids from maleic anhydride in the presence of acetic anhydride and hydrogen peroxide as catalyst. The polymaleic acids obtainable therefrom by hydrolysis are used as builders and incrustation inhibitors in detergents.

EP-A 0 396 303 discloses a process for preparing polymers of maleic acid in which the polymerization of the maleic acid is carried out where appropriate in the presence of copolymerizable water-soluble ethylenically unsaturated monomers using from 12 to 150 g of hydrogen peroxide and from 0.3 to 500 ppm, in each case based on the monomers used, of a multiply charged metal ion. The polymers of maleic acid obtainable in this way have improved biodegradability. They are used as builders in detergents or as scale inhibitors. A similar process for preparing maleic acid polymers by polymerization of maleic acid in aqueous medium is disclosed in EP-A 0 337 694.

WO-A 94/12571 discloses mixtures of polymers of monoethylenically unsaturated dicarboxylic acids with a molecular weight of from 200 to 5,000 and copolymers of ethylenically unsaturated carboxylic acids, graft copolymers of monoethylenically unsaturated carboxylic acids on mono-, oligo- or polysaccharides and/or polyaminocarboxylic acids. These mixtures are used as additive to phosphate-free or reduced phosphate textile detergents or as dispersants and preventers of deposits in cleaners for hard surfaces.

It is an object of the present invention to provide novel substances. The novel substances are intended in particular to have a better incrustation-inhibiting action than the additives hitherto used for this purpose in textile detergents.

We have found that this object is achieved by water-soluble or water-dispersible graft copolymers obtainable by free-radical graft copolymerization of (I) at least one monoethylenically unsaturated monomer onto (II) polymers with a molecular weight of 200–5,000 of monoethylenically unsaturated dicarboxylic acids or anhydrides thereof, using from 5 to 2,000 parts by weight of (I) per 100 parts by weight of grafting base (II).

The invention additionally relates to a process for preparing the abovementioned water-soluble or water-dispersible graft copolymers by free-radical polymerization of (I) at least one monoethylenically unsaturated monomer in the presence of (II) polymers with a molecular weight of 200–5,000 of monoethylenically unsaturated dicarboxylic acids or anhydrides thereof, using from 5 to 2,000 parts by weight of (I) per 100 parts by weight of grafting base (II).

The invention additionally relates to the use of the water-soluble or water-dispersible graft copolymers described above as additive to phosphate-free or reduced phosphate textile detergents, as dispersants and preventers of deposits in cleaners for hard surfaces and as water-treatment agents for preventing the deposition of scale and the separation out of water hardness in water-conveying systems.

The graft copolymers according to the invention contain as grafting base (II) polymers of monoethylenically unsaturated dicarboxylic acids with a molecular weight of from 200 to 5,000. These can be homo- or copolymers. The polymers can be in the form of the free acids or in partially or completely neutralized form. The neutralization is carried out using alkali metal, ammonium or alkaline earth metal bases, eg. sodium hydroxide, potassium hydroxide, sodium carbonate, potassium carbonate, sodium bicarbonate, potassium bicarbonate, ammonia, amines such as dimethylamine, trimethylamine, diethylamine, triethylamine, n-butylamine, dibutylamine, hexylamine, ethanolamine, diethanolamine, triethanolamine and morpholine, magnesium oxide, magnesium hydroxide, calcium oxide, calcium hydroxide, calcium carbonate and barium hydroxide. Sodium hydroxide or potassium hydroxide solution or ammonia is preferably used to neutralize the polymers.

Suitable as grafting base are polymers of monoethylenically unsaturated dicarboxylic acids, the salts thereof or the anhydrides thereof. Suitable examples are polymers of maleic acid, fumaric acid, itaconic acid, mesaconic acid, citraconic acid and methylenemalonic acid and, where known, the polymers of the corresponding anhydrides. The monomers described here are called monomers of group (a) in the following text.

Preferably used as component (II) is polymaleic acid with a molecular weight of from 200 to 5,000 or the alkali metal or ammonium salts thereof. The polymaleic acids with a molecular weight of from 300 to 2,000 are of particular interest as grafting base. Polymers which contain maleic anhydride units and have a molecular weight of from 200 to 5,000, in particular 400 to 4,000, are particularly preferred as grafting base (II).

Homopolymers of maleic acid are commercially available. They are prepared either by polymerizing maleic acid in aqueous medium by known processes in the form of the free acid or in partially or completely neutralized form with free-radical initiators, which are preferably soluble in water, or by polymerizing maleic anhydride in an aromatic hydrocarbon at from 60° to 200° C. in the presence of polymerization initiators and hydrolyzing the polymers. Examples of polymerization initiators used are di-tertiary-butyl peroxide, organic percarbonates, diacyl peroxides or, preferably, peroxy esters. Examples of suitable aromatic hydrocarbons are toluene, xylene, ethylbenzene, diethylbenzene, isopropylbenzene, diisopropylbenzene or mixtures of said hydrocarbons. Particularly suitable peroxy esters are compounds derived from saturated $C_4$-$C_{10}$-carboxylic acids, eg. tertiary-butyl per-2-ethylhexanoate, tertiary-butyl perpivalate, tertiary-butyl perbenzoate and tertiary-butyl permaleate. Processes for preparing oligomaleic acids of the type described above are disclosed, for example, in U.S. Pat. No. 4,818,795 which has been mentioned as prior art.

Suitable as grafting base (II) are essentially polymers of
(a) 60–100% by weight of monoethylenically unsaturated $C_4$-$C_8$-dicarboxylic acids in the form of the free acids or in a form partially or completely neutralized with alkali metal, ammonium or alkaline earth metal bases, or anhydrides of $C_4$-$C_8$-dicarboxylic acids,
(b) 0–40% by weight of other monoethylenically unsaturated monomers and/or
(c) 0–2% by weight of copolymerizable monomers which contain-at least two non-conjugated ethylenic double bonds in the molecule.

The polymers of the monoethylenically unsaturated dicarboxylic acids can be modified, for example, by copolymerizing them or their alkali metal, ammonium or alkaline earth metal salts or the relevant anhydrides in the presence of monomers of group (b). Suitable monomers of group (b) are all the monomers different from monomers of group (a).

Examples of suitable monomers of group (b) are the following compounds in particular: hydroxyethyl acrylate, hydroxypropyl acrylate, hydroxybutyl acrylate, hydroxyethyl methacrylate, hydroxypropyl methacrylate, hydroxybutyl methacrylate, monoethylene glycol ester of maleic acid, the diester of maleic acid and ethylene glycol, the propylene glycol monoester of maleic acid, monoesters of fumaric acid derived from ethylene glycol or propylene glycol, the diester of maleic acid derived from propylene glycol, the ethylene glycol diester of fumaric acid, monoesters of acrylic acid and polyethylene glycols with a molecular weight of from 200 to 6,000, methacrylic esters of polyethylene glycols with a molecular weight of from 300 to 1,000, vinyl formate, vinyl acetate, vinyl propionate, vinyl butyrate, acrylic acid, methacrylic acid, acrylamidomethylpropanesulfonic acids, vinylphosphonic acid, vinylsulfonic acid, acrylic esters of monohydric $C_1$-$C_{18}$-alcohols such as methyl acrylate, ethyl acrylate, n-propyl acrylate, iso-propyl acrylate, n-butyl acrylate, isobutyl acrylate, tert-butyl acrylate, 2-ethylhexyl acrylate and stearyl acrylate, and the mono- and diesters of maleic acid with monohydric $C_1$-$C_{18}$-alcohols such as monomethyl maleate, dimethyl maleate, monoethyl maleate, diethyl maleate, monopropyl maleate, dipropyl maleate, mono-tert-butyl maleate, di-tert-butyl maleate, monomethyl fumarate, dimethyl fumarate, mono-tert-butyl fumarate, di-tert-butyl fumarate, monomethyl itaconate, dimethylaminoethyl acrylate, dimethylaminoethyl methacrylate, diethylaminoethyl acrylate, diethylaminoethyl methacrylate, dipropylaminoethyl acrylate, dipropylaminoethyl methacrylate, dipropylaminoneopentyl acrylate and dimethylaminoneopentyl methacrylate, and styrene, α-methylstyrene, 1-olefins with 2–30 carbon atoms such as ethene, propene, isobutene, diisobutene, octadecene and alkyl vinyl ethers with 1–30 carbon atoms in the alkyl radical such as methyl vinyl ether, ethyl vinyl ether and isobutyl vinyl ether.

The monomers of group (b) which are preferably used are hydroxyethyl acrylate, hydroxypropyl acrylate, hydroxybutyl acrylate, hydroxyethyl methacrylate, hydroxypropyl methacrylate, hydroxybutyl methacrylate, vinyl acetate, vinyl propionate, dimethylfumarate, di-tert-butyl maleate, acrylamido-2-methylpropanesulfonic acid, acrylic acid, methacrylic acid, vinylphosphonic acid, methyl vinyl ether, styrene, diisobutylene and isobutene. If monomers of group (b) are employed, they are preferably used in an amount of from 1 to 30% of the weight of the monomer mixture.

The polymers of the monoethylenically unsaturated dicarboxylic acids or anhydrides thereof can also be chain-extended. Polymers of this type are disclosed in abovementioned EP-A 0 264 627. They are prepared, for example, by polymerizing monoethylenically unsaturated dicarboxylic acids or anhydrides thereof with up to 2% by weight of a compound having at least 2 non-conjugated ethylenic double bonds in aromatic hydrocarbons at from 60° to 200° C. in the presence of from 1 to 20% by weight, based on the monomers used, of an initiator. Peroxy esters are preferably employed as initiator. These polymers also have molecular weights of up to 5,000.

Monomers which contain at least 2 non-conjugated ethylenic double bonds are normally used as chain extenders in the polymerization. They are indicated above as component (c) which may be present in the preparation of the polymers of maleic acid.

Examples of suitable chain extenders of this type are diacrylates or dimethacrylates of at least dihydric saturated alcohols, eg. ethylene glycol diacrylate, ethylene glycol dimethacrylate, 1,2-propylene glycol diacrylate, 1,2- propylene glycol dimethacrylate, 1,4-butanediol diacrylate, 1,4-butanediol dimethacrylate, hexanediol diacrylate, neopentyl glycol diacrylate, neopentyl glycol dimethacrylate, 3-methylpentanediol dimethacrylate. The acrylic and methacrylic esters of alcohols with more than 2 OH groups can also be employed as chain extenders, eg. trimethylolpropane triacrylate or trimethylolpropane trimethacrylate. Another class of chain extenders comprises diacrylates or dimethacrylates of polyethylene glycols or polypropylene glycols with molecular weights of, in each case, from 200 to 6,000. Polyethylene glycols and polypropylene glycols used to prepare the diacrylates or dimethacrylates preferably have a molecular weight of, in each case, from 400 to 1,000. Apart from the homopolymers of ethylene oxide or propylene oxide, it is also possible to employ block copolymers of ethylene oxide and propylene oxide which contain the ethylene oxide and propylene oxide units in random distribution. Oligomers of ethylene oxide or propylene oxide are also suitable for preparing the chain extenders, eg. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate. Also suitable as chain extenders are vinyl esters of ethylenically unsaturated $C_3$-$C_6$-carboxylic acids, eg. vinyl acrylate, vinyl methacrylate or vinyl itaconate. Additionally suitable as chain extenders are vinyl esters of saturated carboxylic acids containing at least 2 carboxyl groups, and di- and polyvinyl ethers of at least dihydric alcohols, eg. divinyl adipate, butanediol divinyl ether and trimethylolpropane trivinyl ether. Other chain extenders are allyl esters of ethylenically unsaturated carboxylic acids, eg. allyl acrylate and allyl methacrylate, allyl ethers of polyhydric alcohols, eg. pentaerythritol triallyl ether, triallylsucrose and pentaallylsucrose. Also suitable as chain extenders are methylenebisacrylamide, methylenebismethacrylamide, divinylethyleneurea, divinylpropyleneurea, divinylbenzene, divinyldioxane, tetraallylsilane and tetravinylsilane.

The copolymerization of monomers (a) and (b) can also be carried out in the presence of monomers (c), of which up to 2% by weight, based on the mixture of monomers (a), (b) and (c), are used and which comprise compounds containing at least 2 non-conjugated ethylenic double bonds as already mentioned above. The molecular weight of the copolymers of monoethylenically unsaturated dicarboxylic acids or anhydrides thereof is likewise from 200 to 5,000 and is preferably in the range from 300 to 2,000.

Preferably used as grafting base (II) are polymaleic acids with a molecular weight of from 300 to 2,000, the alkali metal or ammonium salts thereof, and copolymers of maleic acid and hydroxyethyl acrylate, hydroxypropyl acrylate, hydroxybutyl acrylate, vinyl acetate, isobutene, diisobutene, styrene, methacrylic acid and/or acrylic acid. These compounds are employed either in the form of the free acids or in a form at least partially neutralized with sodium hydroxide solution or ammonia. Polymaleic anhydride with a molecular weight of from 400 to 4,000 is particularly preferably used as grafting base.

From 5 to 2,000 parts by weight of at least one type of monoethylenically unsaturated monomer are grafted onto 100 parts by weight of grafting base (II). Suitable monoethylenically unsaturated monomers (I) are all monoethylenically unsaturated monomers which result in water-soluble or water-dispersible graft copolymers. These can be, for example, water-soluble monoethylenically unsaturated monomers or else water-insoluble monoethylenically unsaturated monomers. The water-insoluble monomers are used in the graft copolymerization only in an amount such that the resulting graft copolymers are still soluble or dispersible in water. Examples of suitable monoethylenically unsaturated monomers are monoethylenically unsaturated carboxylic acids with from 3 to 10 carbon atoms and the esters of the carboxylic acids with monohydric $C_1$-$C_{18}$-alcohols. Examples of these compounds are acrylic acid, methacrylic acid, crotonic acid, vinyllactic acid, ethacrylic acid, maleic acid, itaconic acid, methyl acrylate, methyl methacrylate, ethyl acrylate, ethyl methacrylate, n-propyl acrylate, n-propyl methacrylate, n-butyl acrylate, n-butyl methacrylate, 2-ethylhexyl acrylate, 2-ethylhexyl methacrylate, stearyl acrylate, stearyl methacrylate, sec-butyl acrylate, sec-butyl methacrylate, tert-butyl acrylate, neopentyl acrylate, n-hexyl acrylate, lauryl acrylate and lauryl methacrylate. Also suitable are hydroxyalkyl (meth) acrylates such as hydroxyethyl acrylate, hydroxyethyl methacrylate, hydroxy-n-propyl acrylate, hydroxypropyl methacrylate, hydroxyisopropyl acrylate, hydroxyisopropyl methacrylate, of particular interest being the industrial mixtures obtained on reaction of ethylene oxide or propylene oxide with acrylic acid and/or methacrylic acid, and butanediol monoacrylate and butanediol monomethacrylate. Also suitable as monomers (I) are vinyl esters of $C_1$-$C_{18}$-carboxylic acids, for example vinyl formate, vinyl acetate, vinyl propionate and vinyl pivalate. Further examples of monomers (I) are isobutene, diisobutene, styrene, α-methylstyrene, acrylamide, methacrylamide, acrylonitrile, methacrylonitrile, N-vinylformamide, N-vinylacetamide, N-methyl-N-vinylformamide and cationic monomers such as dialkylamino-$C_2$-$C_4$-alkyl (meth)acrylates, eg. dimethylaminoethyl acrylate, dimethylaminoethyl methacrylate, dimethylaminopropyl acrylate, dimethylaminopropyl methacrylate, dimethylaminobutyl acrylate, dimethylaminobutyl methacrylate, diethylaminoethyl acrylate, diethylaminoethyl methacrylate, diethylaminopropyl acrylate, diethylaminopropyl methacrylate, 1-vinylimidazole, 1-vinyl-2-methylimidazole, N-vinylimidazoline, N-vinyl-2-methylimidazoline, allylamine and dialkylaminoalkyl (meth)acrylamides such as dimethylaminoethylacrylamide and dimethylaminoethylmethacrylamide. Further suitable monomers are N-vinylpyrrolidone, N-vinylcaprolactam, acrylamidopropanesulfonic acid, methallylsulfonate, sulfopropyl acrylate, sulfoethyl acrylate and sulfoethyl methacrylate.

The acidic monomers can be polymerized either in the form of the free acids or in a form partially or completely neutralized with alkali metal, ammonium or alkaline earth metal bases. The basic monomers can be grafted in the form of the free bases, as salt with inorganic or organic acids or in quaternized form, alone or mixed with other monomers, onto the grafting base. Suitable and preferred monomers (I) are monoethylenically unsaturated $C_3$-$C_{10}$-carboxylic acids, esters of these carboxylic acids with $C_1$-$C_{18}$-cobols, hydroxyalkyl acrylates, hydroxyalkyl methacrylates, vinyl esters of $C_1$-$C_{18}$-carboxylic acids, styrene, isobutene, diisobutene, methylstyrene and mixtures thereof. Thus, for example, acrylic acid or mixtures of acrylic acid or methacrylic acid in a desired ratio together with ethylhexyl acrylate or hydroxypropyl acrylate can be grafted onto polymaleic acid or polymaleic anhydride. For example, mixtures of 10–90% by weight of acrylic acid and 90–10% by weight of hydroxypropyl acrylate can be grafted onto the grafting base (II). Products which are very good incrustation inhibitors and, at the same time, good scale inhibitors are prepared by grafting polymaleic acid or polymaleic anhydride with a mixture of acrylic acid and maleic acid monomers. Mixtures of this type contain, for example, from 10 to 70% by weight of maleic acid and from 90 to 30% by weight of acrylic acid.

Other effective additives for textile detergents can be obtained by grafting acrylic acid and/or methacrylic acid mixed with at least one monomer from the group consisting of vinyl acetate, vinyl propionate, hydroxyethyl acrylate, hydroxypropyl acrylate, methyl acrylate, methyl methacrylate, ethyl acrylate, ethyl methacryate, propyl acrylate or isopropyl acrylate onto polymaleic anhydride or polymaleic acid. Other products of interest both for use in detergents and as scale inhibitors and as dispersants are prepared by grafting polymaleic anhydride or polymaleic acid with (a) acrylic acid and/or methacrylic acid, and
(b) vinyl formate, vinyl acetate, vinyl propionate, hydroxyethyl acrylate, hydroxypropyl acrylates, hydroxypropyl methacrylates, hydroxyethyl methacrylate and acrylic esters of $C_1$-$C_{18}$-alcohols and/or
(c) acrylamidomethylpropanesulfonic acid, methallylsulfonate, sulfopropyl acrylate, sulfoethyl acrylate, sulfoethyl methacrylate and/or vinylsulfonate.

It is also possible to graft onto the grafting base (II), especially onto polymaleic anhydride or polymaleic acid, those monomer mixtures which produce amphoteric graft copolymers, eg. the following groups of monomers can be grafted together onto the grafting base (II):

(1) acrylic acid and/or methacrylic acid, and
(2) cationic monomers, for example dimethylaminoethyl acrylate in the form of salts with hydrochloric acid or sulfuric acid or in the form of the methochloride, diethylaminoethyl acrylate, dimethylaminoethyl methacrylate, vinylimidazole, 1-vinyl-2-methylimidazole, N-vinylimidazoline, N-vinyl-2-methylimidazoline and monomers which on hydrolysis form an amino or ammonium group, eg. N-vinylformamide, N-vinyl-N-methylacetamide or N-vinylacetamide and/or
(3) vinyl formate, vinyl acetate, vinyl propionate, acrylonitrile, methacrylonitrile, acrylamide, methacrylamide and esters of acrylic acid, methacrylic acid and maleic acid with $C_1$-$C_{18}$-alcohols.

Graft copolymers containing a vinyl ester or other esters as copolymerized units can be hydrolyzed in a reaction on the polymers. Thus, for example, vinyl alcohol units are produced on hydrolysis from copolymerized units of vinyl formate, vinyl acetate or vinyl propionate. Elimination of the formyl group from copolymerized N-vinylformamide units results in vinylamine or vinylammonium units. N-Vinylformamide can be hydrolyzed, for example, with acids or bases. Where the copolymers contain, apart from vinylformamide, as copolymerized units a Vinyl ester, acrylic ester, acrylonitrile or acrylamide, the hydrolysis of the copolymers in most cases results not only in elimination of formyl groups from the copolymerized vinyl formate but also in hydrolysis of the other units present in the copolymer.

The graft copolymers are prepared by free-radical polymerization. The graft copolymerization can be carried out in bulk, solution, suspension or emulsion. Examples of suitable solvents are water, alcohols, ketones, esters, aliphatic and aromatic hydrocarbons and chlorohydrocarbons, and dialkyl ethers. The dialkyl ethers can also be derived from polyalkylene glycols. If the grafting is carried out in emulsion, the presence of emulsifiers is necessary. Suitable examples are nonionic and ionic surfactants. They are added in amounts of from 0.1 to 5% by weight to the graft component.

Polymers which contain maleic anhydride units and have a molecular weight of from 200 to 5,000, in particular from 300 to 3,000, are preferably used as grafting base (II). Polymers of this type are normally prepared by precipitation polymerization in aromatic hydrocarbons such as toluene, xylene, ethylbenzene or isopropylbenzene. The graft copolymerization advantageously takes place immediately after the preparation of the polymaleic acids and in the same apparatus. In other cases it is advantageous to carry out the polymerization in aqueous solution, specifically when the grafting base has been prepared by polymerizing maleic acid as disclosed, for example, in EP-A 0 396 303. Graft copolymers of particular interest for use as water-treatment agents (scale inhibitors) are those obtainable by grafting mixtures of isobutene, diisobutene and styrene monomers with maleic anhydride onto polymaleic anhydride, eg. graft copolymers which contain on a grafting base of polymaleic anhydride polymer chains composed of alternating copolymers of isobutene and maleic anhydride or diisobutylene and maleic anhydride or styrene and maleic anhydride. The polymer chains may, however, contain said monomers in random distribution so that the grafted-on polymer chains contain, for example, from 10 to 50 mol % of diisobutene, isobutene or styrene and from 50 to 90 mol % of maleic anhydride. The polymers are normally converted into an aqueous solution for use. This can take place, for example, by removing the aromatic hydrocarbon used as solvent, such as toluene or xylene, by steam distillation, and partially or completely neutralizing the graft copolymers by adding alkali metal or ammonium bases, in particular sodium hydroxide or potassium hydroxide solution or ammonia or ethanolamine. This results directly in polymer solutions ready for use.

Preferably from 7.5 to 500, and in particular from 10 to 200, parts by weight of at least one group of monoethylenically unsaturated monomers are used for 100 parts by weight of grafting base.

The water-soluble or water-dispersible graft copolymers described are generally prepared in the presence of free-radical initiators. Suitable and preferred free-radical initiators are all those compounds which have a half-life of less than 3 hours at the particular polymerization temperature chosen. If the polymerization is started at a lower temperature and completed at a higher temperature, it is expedient to use at least two initiators which decompose at different temperatures, namely an initiator which decomposes at lower temperature for the start of the polymerization and then an initiator which decomposes at higher temperature for completing the main polymerization. It is possible to use water-soluble and water-insoluble initiators or mixtures of water-soluble and water-insoluble initiators. Initiators which are insoluble in water are normally soluble in the organic phase.

The initiators which can be advantageously used for the temperature ranges stated below are those indicated there:

Temperature: 40°–60° C.:
Acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), 2,2'-azobis(2-methyl-N-phenylpropionamidine) dihydrochloride, 2,2'-azobis(2-methylpropionamidine) dihydrochloride;

Temperature: 60°–80° C.:
tert-Butyl perpivalate, dioctanoyl peroxide, dilauroyl peroxide, 2,2'-azobis(2,4-dimethylvaleronitrile);

Temperature: 80°–100° C.:
Dibenzoyl peroxide, tert-butyl per-2-ethylhexanoate, tert-butyl permaleate, 2,2'-azobis(isobutyronitrile), dimethyl-2,2'-azobisisobutyrate, sodium persulfate, potassium persulfate, ammonium persulfate;

Temperature: 100°–120° C.
bis(tert-Butylperoxy)cyclohexane, tert-butyl peroxyisopropyl carbonate, tert-butyl peracetate, hydrogen peroxide;
Temperature: 120°–140° C.:
2.2-bis(tert-Butylperoxy)butane, dicumyl peroxide, di-tert-amyl peroxide, di-tert-butyl peroxide;
Temperature: >140° C.:
p-Menthane hydroperoxide, pinane hydroperoxide, cumene hydroperoxide and tert-butyl hydroperoxide.

If, in addition to said initiators, also salts or complexes of heavy metals, eg. copper, cobalt, manganese, iron, vanadium, cerium, nickel or chromium salts, or organic compounds such as benzoin, dimethylaniline or ascorbic acid are used, it is possible to reduce the half-lives of the stated free-radical initiators. Thus, for example, tert-butyl hydroperoxide can be activated by adding 5 ppm copper(II) acetylacetonate so that polymerization is possible at 100° C. The reducing component of redox catalysts can also be formed, for example, by compounds such as sodium sulfite, sodium bisulfite, sodium formaldehyde sulfoxylate and hydrazine.

Based on the monomers (I) used in the polymerization, from 0.01 to 30, preferably from 0.05 to 15, % by weight of a polymerization initiator or a mixture of several polymerization initiators are used. As redox components, from 0.01 to 30% by weight of the reducing compounds are added. Heavy metals are used in the range from 0.1 to 100 ppm, preferably 0.5 to 10 ppm. It is often advantageous to employ a combination of peroxide, reducing agent and heavy metal as redox catalyst.

The monomers (I) can also be polymerized by the action of ultra-violet radiation, in the presence or absence of UV initiators. For polymerization by the action of UV rays, the photo-initiators or sensitizers normally suitable for this purpose are used. These are, for example, compounds such as benzoin or benzoin ethers, α-methylbenzoin or α-phenylbenzoin. It is also possible to use triplet sensitizers, eg. benzil diketals. Examples of sources of UV radiation are, besides high-energy UV lamps such as carbon arc lamps, mercury vapor lamps or xenon lamps, also low-UV light sources such as fluorescent tubes with a high blue content.

In order to prepare polymers with a low K value, the graft copolymerization is expediently carried out in the presence of regulators. Examples of suitable regulators are organic compounds containing sulfur in bound form, such as mercapto compounds, eg. mercaptoethanol, mercaptopropanol, mercaptobutanol, mercaptoacetic acid, mercaptopropionic acid, butyl mercaptan and dodecyl mercaptan. Also suitable as regulators are allyl compounds, eg. allyl alcohol, aldehydes such as formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight, based on the monomers (I) used in the graft copolymerization, thereof are required.

The polymerization is normally carried out under an inert gas atmosphere with exclusion of atmospheric oxygen. Generally care is taken that the reactants are thoroughly mixed during the polymerization. In the case of smaller batches where dissipation of the heat of polymerization is ensured, it is possible to polymerize the reactants, which are preferably in an inert diluent, batchwise by heating the reaction mixture to the polymerization temperature. This temperature is normally in the range from 20° to 180° C. However, this method sometimes results in graft copolymers which are intrinsically somewhat non-homogeneous and therefore do not achieve their optimal activity.

In order to be able better to control the course of the polymerization, therefore, the monomers (I) are added continuously or batchwise to the grafting base at a rate such that the graft copolymerization can easily be controlled in the desired temperature range. The preferred mode of addition is to introduce component (II) or at least part of component (II) into the polymerization reactor and heat it therein to the required polymerization temperature while stirring. As soon as this temperature is reached, the monomers (I) and the initiator and, where appropriate, a regulator are added over a period of about 0.5–10, preferably 1–8, hours. Such a procedure is advantageously used, for example, when the components are polymerized in an inert diluent in which the grafting base is suspended, and when the graft copolymerization is carried out in solution.

The graft copolymers can also be prepared by the processes of suspension or solution polymerization of components (I) and (II) in aqueous medium, with solution polymerization in water being particularly preferred. The procedure for solution polymerization in aqueous medium is, for example, to introduce component (II) into the aqueous medium, heat to the required polymerization temperature, and add the monomers (I) continuously or batchwise to the polymerizing reaction mixture. The pH of the mixture can be in the range from 0.5 to 14. At a low pH, the monomers containing acid groups, eg. (meth)acrylic acid, of component (I) are employed in the acid form, while these monomers are in the salt form at high pH.

Polymers which are slightly colored and particularly effective are obtained when the polymerization is carried out in the pH range from 4 to 8. This can take place by adjusting the acid groups to the required pH before the polymerization, or by keeping the pH constant during the polymerization by continuous addition of neutralizing agent. Particularly suitable neutralizing agents are sodium hydroxide and potassium hydroxide solutions, ammonia, ethanolamine, diethanolamine or triethanolamine. Water-soluble initiators or initiator systems are particularly preferred for solution polymerization in water. In a particularly favorable mode of preparation, water and component (II), where appropriate in partially or completely neutralized form, are introduced into the reactor and, at the chosen polymerization temperature, the monomers (I) are metered in batchwise or continuously over the course of 0.5 to 10 hours.

In a preferred mode of preparation there is preparation in a one-pot process of the grafting base (II) as solution or precipitation polymer in an aromatic hydrocarbon, and then immediate addition of at least one group of the monomers of component (I), all at once or distributed over a lengthy period, and polymerization.

As soon as the temperature during the polymerization is higher than the boiling point of the inert diluent or solvent or of the monomers, the polymerization is carried out under elevated pressure. The concentration of components (I) and (II) on polymerization in the presence of inert solvents or inert diluents is, as a rule, from 10 to 80, preferably 20 to 70, % by weight. The graft copolymers can be prepared in conventional polymerization equipment. Examples used for this purpose are stirred vessels equipped with an anchor, blade, impeller or multistage impulse countercurrent agitator.

The described processes result in water-soluble or water-dispersible graft copolymers with K values according to H. Fikentscher of from 6 to 150 (measured on 1% by weight aqueous solutions of the Na salts of the polymer at pH 7 and 25° C.). The preferred K values for the application according to the invention are in the range from 6 to 100, in particular 6 to 50.

The percentage data in the examples are percent by weight unless indicated otherwise. The parts are parts by weight. The molecular weights of the polymers were determined on the sodium salts by the method of gel permeation chromatography (GPC) with aqueous eluents. The separation columns are calibrated with sodium polyacrylate mixtures which have a wide distribution and whose cumulative molecular weight distribution curve was determined by coupled GPC/laser light scattering by the calibration principle of M. J. R. Cantow et al. (cf. J. Polym. Sci. A-1.5 (1967) 1391–1394, although without the concentration correction proposed therein, cf. R. Brüssau, W. Goetz, W. M ächtle and J. Stölting, Characterization of Polyacrylate Samples in Tenside Surfactants Detergents 28 (1991) 396–406).

The graft copolymers described above are used as additive to phosphate-free or reduced phosphate textile detergents. In them they improve, in an unexpected manner, the incrustation inhibition and, at the same time, improve the single wash cycle performance by comparison with the individual components.

Reduced phosphate textile detergents mean those formulations which contain up to 25% by weight of phosphate, calculated as pentasodiumtriphosphate. The detergent formulations normally contain surfactants in amounts of from 1 to 50% by weight, in some cases even larger amounts of surfactant, with or without builders. These data apply both to liquid and to powder detergent formulations. Examples of the composition of detergent formulations customary in Europe, the USA and Japan are to be found, for example, in Chemical and Engn. News, 67 (1989) 35 in the form of tables, and in Ullmanns Encyklopädie der technischen Chemie, Verlag Chemie, Weinheim 1983, 4th Edition, pages 63–160. Such detergent formulations may additionally contain alkali metal silicates, in amorphous form or as sheet silicates, as builders.

The graft copolymers according to the invention are particularly advantageously employed in phosphate-free compact detergents. Detergents of this type contain, for example, 5–25, preferably 10–20, % by weight of anionic and/or nonionic surfactants, 20–45% by weight of zeolite A or sheet silicates, which can be either amorphous or crystalline, as builders, 10–20% by weight of sodium carbonate and 3–10% by weight of the graft copolymers according to the invention.

The formulations described above may additionally contain further conventional additives, eg. polyvinylpyrrolidone as color transfer inhibitor, carboxymethylcellulose and/or bleaches such as perborates.

The graft copolymers according to the invention can also be used together with previously disclosed polymers such as poly(meth)acrylic acids, copolymers of acrylic acid and maleic acid, graft copolymers of monoethylenically unsaturated carboxylic acids onto mono-, di- and polysaccharides and/or polyaspartic acids. The known incrustation inhibitors can be combined together in any desired ratios. Some mixtures of this type show synergistic effects, eg. mixtures of the graft copolymers according to the invention and polyaspartic acid or copolymers of acrylic acid and maleic acid.

The graft copolymers of components (I) and (II) are present in the detergent formulations in an amount of from 0.2 to 20, preferably 0.5 to 15, % by weight.

Water softeners can be added in addition to the detergents to the washing process and normally contain sodium tripolyphosphate, zeolite, nitrilotriacetate, with or without surfactants and 2–40% of the polymer mixtures according to the invention. A phosphate-free water softener formulation contains, for example, 70% zeolite A, 15% sodium carbonate, 5% citrate and 10% of the graft copolymers.

The mixtures according to the invention are additionally used as dispersants and preventers of deposits in cleaners for hard surfaces. Compared with the standard polymers in a cleaner formulation, the graft copolymers also in this case surprisingly display a considerably better inhibition of deposits than the polyacrylic acids or salts thereof which are customarily employed.

Cleaners for hard surfaces mean, for example, cleaners for metals, plastics, glass and ceramics, floor cleaners, toilet cleaners, all-purpose cleaners for domestic and commercial uses, industrial cleaners (for use in vehicle washing systems or high-pressure cleaners), low-temperature cleaners, dishwashing agents, rinse aids, disinfecting Cleaners, cleaners for the foodstuffs and beverage industries, especially as bottle cleaners, as CIP (cleaning in place) cleaners in dairies, breweries and other food manufacturing plants. Cleaners which contain the polymer mixtures according to the invention are particularly suitable for cleaning hard surfaces such as glass, plastic and metal. The cleaners can be adjusted to be alkaline, acidic or neutral. They normally contain surfactants in amounts of about 0.2–50% by weight. These may be anionic, nonionic or cationic surfactants and mixtures of mutually compatible surfactants, eg. mixtures of anionic and non-ionic or of cationic and nonionic surfactants. Alkaline cleaners may contain sodium carbonate, potassium carbonate, sodium bicarbonate, potassium bicarbonate, sodium sesquicarbonate, potassium sesquicarbonate, sodium hydroxide, potassium hydroxide, amine bases such as monoethanolamine, diethanolamine, triethanolamine, ammonia or silicate in amounts of up to 60% by weight, in some cases even up to 80% by weight. The cleaners may additionally contain citrates, gluconates or tartrates in amounts of up to 80% by weight. They may be in solid or liquid form. The graft copolymers of components (I) and (.II) according to the invention are present in the cleaners in amounts of from 0.2 to 20, preferably 0.5 to 15, % by weight.

The graft copolymers according to the invention can also be used as water-treatment agents for reducing the deposition of scale and the separation out of water hardness in water-conveying systems. It is possible to combine the polymers according to the invention with other dispersants such as phosphonates, phosphonoalkanecarboxylic acids etc.

The mode of action of the graft copolymers as preventers of deposits (scale inhibitors) for water treatment comprises preventing the formation of crystals of salts of the hardness producers, such as calcium carbonate, magnesium oxide, magnesium carbonate, calcium, barium or strontium sulfate, calcium phosphate (apatite) and the like in the substoichiometric dosage range, or influencing the formation of these precipitates in such a way that no hard and scale-like deposits are produced, on the contrary the deposits formed can easily be flushed out and are finely dispersed in the water. The surfaces of, for example, heat exchangers, pipes or pump components are kept free of deposits in this way, and their tendency to corrode is reduced. There is, in particular, a reduction in the risk of pitting under these deposits. Furthermore, the growth of microorganisms on these metal surfaces is impeded. The preventers of deposits can have the effect of increasing the useful life of such systems and considerably reducing the stoppage times for cleaning system components. The amounts thereof required to prevent deposits are from 0.1 to 100, preferably 0.5 to 25 ppm, based on the amount of water in each case. The water-conveying systems are, for example, open or closed cooling circulations, for example of power stations or chemical plants, such as reactors, distillation apparatus and similar components where heat must be dissipated. These preventers of deposits can also be used in boiler waters and steam generators, preferably where the water temperature is in the range below 150° C. A preferred application of the preventers of deposits to be used according to the invention is furthermore the desalination of sea water and brackish water by distillation or membrane processes, such as reverse osmosis or electrodialysis. Thus, for example, sea water concentrated for desalination in the MSF (multistage flash evaporation) process is circulated at elevated temperature. In this case, the preventers of deposits effectively suppress the deposition of hardness producers such as brucite and the caking thereof on components of the system.

In membrane processes it is possible effectively to prevent damage to the membranes due to hardness producers crystallizing out. In this way, these preventers of deposits make it possible for concentration factors to be higher, the yield of pure water to be improved and the useful lives of the membranes to be increased. Another application of the preventers of deposits is, for example, in the evaporation of cane or beet sugar juices. In contrast to the applications described above, in this case, for example, calcium hydroxide, carbon dioxide, sulfur dioxide or, where appropriate, phosphoric acid is added to the thin juice for purification. Calcium salts of low solubility, such as calcium carbonate, sulfate or phosphate, remaining in the sugar juice after filtration then precipitate during the evaporation process and may produce stone-hard deposits on heat exchanger surfaces. This also applies to concomitant substances in the sugar, such as silica or calcium salts of organic acids such as oxalic acid.

Similar problems arise in processes following sugar production, for example alcohol production from sugar production residues.

The graft copolymers which can be used according to the invention as preventers of deposits are able substantially to suppress the abovementioned formation of deposits so that stoppage times to clean the systems, eg. by boiling out, can be crucially reduced. An essential aspect in this connection is furthermore the considerable saving in energy by avoiding the thermally insulating deposits mentioned.

The amounts of the preventer of deposits required for the described applications vary but are from 0.1 to 100 ppm based on cooling water, boiler water, process water or, for example, sugar juice employed.

The products to be used according to the invention are better at dispersing salts of hardness producers, such as Ca carbonate, Ca sulfate and Ca phosphate, and, furthermore, are more compatible with Ca ions than acrylic acid homopolymers.

The K values of the copolymers were determined by the method of H. Fikentscher, Cellulose-Chemie, 13 (1932) 58–64 and 71–74, in aqueous solution at pH 7, at 25° C. and with a concentration of the potassium salt of the copolymer of 1% by weight, unless otherwise indicated. The percentage data are based on the weight of the substances.

EXAMPLES

Example 1

400 g of maleic anhydride and 500 g of ethylbenzene are heated to 100° C. in a reactor with condenser and introduction devices while passing a gentle strew/nor nitrogen (10 l/h) through. Over the 20 course of 7 hours, a solution of 30 g of tert-butyl perethylhexanoate in 60 g of ethylbenzene is metered in at a constant rate at 100° C. After 6 hours, 99% of the maleic anhydride has polymerized. Then, over the course of 1 hour, a solution of 80 g of acrylic acid in 40 g of ethylbenzene is metered in at a constant rate. After addition of the monomers and the initiator, the reaction mixture is heated at 100° C. for 2 hours. Subsequently 300 g of distilled water are added and the ethylbenzene is distilled out by passing in steam. Steam is passed in until the internal temperature in the reactor has reached 100° C. Neutralization with 550 g of 50% strength aqueous potassium hydroxide solution is then carried out. The solids content of the resulting clear yellow polymer solution is 45.5% and the pH is 4.8. The K value of the graft copolymer is 7.5 (measured on the 5% strength polymer solution in water, which has been adjusted to pH 7 with potassium hydroxide solution, at 25° C.). The molecular weight $M_w$ is 1,210.

Example 2

Example 1 is repeated with the exceptions that a solution of 120 g of acrylic acid in 40 g of ethylbenzene is grafted onto polymaleic anhydride. The clear yellow polymer solution obtainable in this way has a solids content of 44.8% and a pH of 4.5. The molecular weight $M_w$ of the graft copolymer is 1,770.

Example 3

Example 1 is repeated with the exceptions that a solution of 160 g of acrylic acid in 40 g of ethylbenzene is used on the polymaleic anhydride initially prepared as grafting base. As a difference from Example 1, the reaction mixture is neutralized with 570 g of 50% strength aqueous potassium hydroxide solution. The clear yellow solution of the graft copolymer had a solids content of 45.5% and a pH of 4.5. The molecular weight $M_w$ is 2,610.

Example 4

Example 1 is repeated with the exception that 80 g of methacrylic acid are now grafted, in place of acrylic acid, onto polymaleic anhydride. As a difference from Example 1, 530 g of 50% strength aqueous potassium hydroxide solution were used for the neutralization. The clear yellow aqueous solution of the salt of the graft copolymer had a solids content of 45% and a pH of 4.5. The molecular weight $M_w$ is 1,570.

Example 5

Example 1 is repeated with the sole exception that 80 g of hydroxypropyl acrylate are grafted onto the polymaleic anhydride acting as grafting base. After the ethylbenzene had been distilled off, the reaction mixture was neutralized by adding 450 g of 50% strength aqueous potassium hydroxide solution. The result is a clear yellow aqueous solution of a partially neutralized graft copolymer with a solids content of 44.4% and a pH of 4.5. The molecular weight of the graft copolymer is 1,150.

Example 6

Example 1 is repeated with the exception that 80 g of styrene are grafted in place of acrylic acid onto polymaleic anhydride. After removal of the ethylbenzene, the aqueous solution is neutralized by adding 480 g of 50% strength aqueous potassium hydroxide solution. The milky yellow dispersion has a solids content of 45.2% and a pH of 4.5.

Example 7

Example 1 is repeated with the exception that 80 g of n-butyl acrylate are grafted in place of acrylic acid onto the polymaleic anhydride acting as grafting base. After the ethylbenzene has been distilled off, the reaction mixture is neutralized by adding 480 g of 50% strength aqueous potassium hydroxide solution. The slightly cloudy yellowish solution has a solids content of 45.2% and a pH of 4.5. The K value of the graft copolymer which has been adjusted to pH 7.0 is 6.6 at a polymer concentration of 5% in water.

The graft copolymers described above were tested for their suitability as detergent additives. In order to test the effect of the graft copolymers on the single wash and multiwash cycle performance, the following detergent formulation was used:

8.0% dodecylbenzenesulfonate
7.0% $C_{13}$-$C_{15}$ oxo alcohol +7 ethylene oxide
2.0% soap
36.0% zeolite A
12.0% sodium carbonate
5.0% polymer (100% pure) as indicated in Table 1
1.0% CMC (carboxymethylcellulose)
22.0% sodium perborate monohydrate
3.5% bleach activator (ethylenediaminetetraacetic acid Na salt)
0.2% commercial optical brightener
3.3% sodium sulfate
Washing conditions:

|  | Single wash cycle performance | Multiwash cycle performance Incrustation |
|---|---|---|
| Washing machine | Launder-O-meter | Launder-O-meter |
| Water hardness | 3 mmol Ca/Mg/l = 16.8° d | 4 mmol Ca/Mg/l = 22.4° d |
| Ca:Mg ratio | 4:1 | 4:1 |
| Washing temperature | 60° C. | 60° C. |
| Wash cycles | 1 | 15 |
| Detergent dosage | 4.5 g/l | 4.5 g/l |
| Liquor ratio | 1:12.5 | 1:12.5 |
| Fabric | *WFK 10 D WFK 20 D } each 5 g EMPA 101 EMPA 104 } each 5 g cotton (10 g) | cotton |
|  |  | fabric ashed in a muffle furnace at 700° C. |

* WFK fabric 10D and 20D (standard soiling with pigment/sebum)
EMPA fabric 101 and 104 (standard soiling with carbon black/olive oil)
Degree of whiteness=total reflectance from 4 fabrics

| WFK 10 D | Cotton |
| WFK 20 D | Polyester/cotton |
| EMPA 101 | Cotton |
| EMPA 104 | Polyester/cotton |

The polymers and polymer mixtures used in the tests and the results thereof are indicated in Table 1.

TABLE 1

Single wash and multiwash cycle performance of graft copolymers in the detergent formulation described above

| Comparative example | Addition of polymer obtained in example | Degree of whiteness [reflectance] | Ash (% by weight) |
|---|---|---|---|
| 1 | no addition | 164.3 | 3.46 |
| 2 | commercial polymer of 70% by weight acrylic acid and 30% by weight maleic acid molecular weight 70,000 | 179.6 | 2.73 |
| Example |  |  |  |
| 8 | 1 | 169.9 | 0.73 |
| 9 | 2 | 173.8 | 0.62 |
| 10 | 3 | 173.5 | 0.72 |
| 11 | 4 | 172.1 | 0.66 |
| 12 | 5 | 177.5 | 0.66 |
| 13 | 6 | 170.3 | 0.81 |
| 14 | 7 | 168.2 | 0.87 |

As is evident from Table 1, the graft copolymers according to the invention are distinctly more effective than a commercial polymer of 70% by weight acrylic acid and 30% by weight maleic acid with molecular weight 70,000.

Example 15

Test of the graft copolymer obtained in Example 5 for use as additive to dishwashing formulations The dishwashing formulation had the following composition:
20% sodium citrate·$2H_2O$
24% sodium disilicate
40% sodium carbonate
7% sodium perborate·$1H_2O$
2% ethylenediaminetetraacetic acid Na salt
2% commercial wetting agent
5% polymer (100% pure).

The test is carried out by using 4 g of the dishwashing formulation described above per liter of drinking water of 10" German hardness. In a Miele type G 590 SC domestic dishwashing machine, 15 wash cycles are carried out with a load consisting of black plastic plates, black china plates, knives and drinking glasses. After the 15 wash cycles, the load was assessed visually. Score 0 means that no deposit is visible on the load even after 15 cycles, whereas score 9 means a very thick deposit. Scores 1–8 are classifications between scores 0 and 9. The washing results are indicated in Table 2. As is evident therefrom, the graft copolymer used according to the invention is distinctly more effective than sodium polyacrylate which is conventionally used.

TABLE 2

| | | Assessment score for | | | |
|---|---|---|---|---|---|
| Comparative example | Addition of polymer | Plastic plates | China plates | Knives | Drinking glasses |
| 3 | none | 9 | 5 | 6 | 7 |
| 4 | sodium polyacrylate $M_W$: ≈4000 | 4–5 | 2–3 | 2 | 4 |
| Example 15 | prepared as in Example 5 | 0–1 | 2 | 1–2 | 2–3 |

TABLE 2-continued

| Comparative example | Addition of polymer | Assessment score for | | | |
|---|---|---|---|---|---|
| | | Plastic plates | China plates | Knives | Drinking glasses |
| | (according to the invention) | | | | |

EXAMPLE 16

Test of the graft copolymers for efficacy on use as scale inhibitors (preventers of deposits) for water treatment In order to establish the use properties of the graft copolymers, their behavior in sea water desalination is assessed. The following test methods were used for this:

Scale inhibition (prevention of deposits) in sea water desalination

In this test, the graft copolymers are investigated as inhibitor of the formation of calcium and magnesium hydroxides and carbonates from synthetic sea water solution. In sea water desalination, calcium carbonate and magnesium hydroxide in particular form firmly adherent and interfering deposits on the surfaces of heat exchangers. The formation of barium sulfate is also a problem which must be taken seriously in this connection. The test solution consists of an aqueous salt solution which contains 70° German hardness of $Mg^{2+}$ 14° German hardness of $Ca^{2+}$ 70° German hardness of $CO_3^{2-}$.

The synthetic sea water solution is then mixed in each case with 25 ppm of the graft copolymers described in Examples 1 to 7 and circulated by pump in a dynamic circulation apparatus for 3 hours. After a test period of 3 hours, samples are taken and analyzed for the content of water hardness by titrimetry. It is possible from the decrease in the water hardness during the test to calculate back to the deposits being formed in the heat exchanger. The lower the degree of hardness in the removed water sample, the more deposit has been produced on the heat exchanger pipes. The water hardnesses found are listed in Table 3. A high degree of hardness after 3 hours of the test suggests good scale inhibition (prevention of deposits).

The results of tests on the graft copolymers according to the invention by comparison with a commercial product are indicated in following Table 3. The commercial product is a polymaleic acid with molecular weight 1000.

TABLE 3

Test conditions:
Test water exit temperature: 112° C.
Pressure: 4 bar
Running time: 3 h

| Comparative example | Scale inhibitor (25 ppm) | Water hardness in ° German hardness | |
|---|---|---|---|
| | | Immediately | After 3 hours of the test |
| 5 | none | 84.0 | 41.5 |
| 6 | commercial polymaleic | 83.0 | 49.0 |

TABLE 3-continued

Test conditions:
Test water exit temperature: 112° C.
Pressure: 4 bar
Running time: 3 h

| Comparative example | Scale inhibitor (25 ppm) | Water hardness in ° German hardness | |
|---|---|---|---|
| | | Immediately | After 3 hours of the test |
| Example | acid scale inhibitor prepared as in example | | |
| 16 | 1 | 83.0 | 50.6 |
| 17 | 2 | 83.0 | 52.1 |
| 18 | 3 | 83.0 | 58.3 |
| 19 | 4 | 83.0 | 57.0 |
| 20 | 5 | 83.0 | 62.1 |
| 21 | 6 | 83.0 | 58.5 |
| 22 | 7 | 83.0 | 60.8 |

As is evident from Table 3, the graft copolymers according to the invention are distinctly more effective than an established commercial product.

We claim:

1. A water-soluble or water-dispersible graft copolymer obtained by free-radical graft copolymerization of
   (I) at least one monoethylenically unsaturated monomer onto
   (ii) a compound with a molecular weight of 200–5000 composed of two or more monomeric units, said compound consisting essentially of a monoethylenically unsaturated dicarboxylic acid or anhydride thereof
   using from 5 to 2000 parts by weight of (I) per 100 parts by weight of grafting base (II).

2. A water-soluble or water-dispersible graft copolymer as claimed in claim 1, wherein monoethylenically unsaturated $C_3$-$C_{10}$-carboxylic acids, esters of these carboxylic acids with $C_1$-$C_{18}$-alcohols, hydroxyalkyl acrylates, hydroxyalkyl methacrylates, vinyl esters of $C_1$-$C_{18}$-carboxylic acids, styrene, isobutene, diisobutene, methylstyrene or mixtures thereof are used as monomers (I).

3. A water-soluble or water-dispersible graft copolymer as claimed in claim 1, wherein compounds of
   (a) 60–100% by weight of monoethylenically unsaturated $C_4$-$C_8$-dicarboxylic acids in the form of the free acids or in a form partially or completely neutralized with alkali metal, ammonium or alkaline earth metal bases, or anhydrides of $C_4$-$C_8$-dicarboxylic acids,
   (b) 0–38% by weight of other monoethylenically unsaturated monomers and/or
   (c) 0–2% by weight of copolymerizable monomers which contain at least two non-conjugated ethylenic double bonds in the molecule,
   are used as grafting base (II).

4. A water-soluble graft copolymer as claimed in claim 1, wherein compounds which contain maleic anhydride units and have a molecular weight of 200–5000 are used as grafting base (II).

5. A process for preparing a water-soluble or water-dispersible graft copolymer as claimed in claim 1, which comprises free-radical polymerization of
   (I) at least one monoethylenically unsaturated monomer in the presence of (II) a compound with a molecular weight of 200–5000 composed of two or more monomeric units, said compound consisting essentially of a monoethylenically unsaturated dicarboxylic acid or anhydride thereof, using from 5 to 2000 parts by weight of (I) per 100 parts by weight of grafting base (II).

6. A process for reducing the deposition of scale and the separation out of water hardness in water-conveying systems, which comprises adding to said water-conveying system, a scale inhibiting amount of the graft copolymer as claimed in claim 1.

7. A process for cleaning a textile comprising applying to said textile a phosphate-free or reduced phosphate textile detergent which comprises from 0.2 to 20% by weight of a graft copolymer as claimed in claim 1.

8. A process for cleaning a textile comprising applying to said textile a phosphate-free or reduced phosphate textile detergent which comprises from 0.5 to 15% by weight of a graft copolymer as claimed in claim 1 for improving inhibition of incrustation.

9. A process for cleaning hard surfaces which comprises applying to said hard surfaces a cleaner which comprises from 0.2 to 20% by weight of a graft copolymer as claimed in claim 1.

* * * * *